United States Patent
Sinha

(10) Patent No.: US 8,966,302 B2
(45) Date of Patent: Feb. 24, 2015

(54) METHOD FOR POWER MANAGEMENT OF DATA BUSES IN ELECTRONIC DEVICES

(75) Inventor: Rajesh Kumar Sinha, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 310 days.

(21) Appl. No.: 12/924,192

(22) Filed: Sep. 21, 2010

(65) Prior Publication Data

US 2011/0320841 A1    Dec. 29, 2011

Related U.S. Application Data

(60) Provisional application No. 61/398,292, filed on Jun. 23, 2010.

(51) Int. Cl.
*G06F 1/00* (2006.01)
*G06F 1/32* (2006.01)

(52) U.S. Cl.
CPC ............ *G06F 1/3203* (2013.01); *G06F 1/3253* (2013.01); *Y02B 60/1253* (2013.01)
USPC .......................................... 713/323; 713/324

(58) Field of Classification Search
USPC .................................. 713/300–340
See application file for complete search history.

(56) References Cited

U.S. PATENT DOCUMENTS

| | | | | |
|---|---|---|---|---|
| 3,919,484 A | * | 11/1975 | Maxemchuk | 370/242 |
| 5,051,982 A | * | 9/1991 | Brown et al. | 370/381 |
| 5,600,839 A | * | 2/1997 | MacDonald | 713/322 |
| 5,617,572 A | * | 4/1997 | Pearce et al. | 713/323 |
| 5,925,135 A | * | 7/1999 | Trieu et al. | 713/400 |
| 6,496,938 B1 | * | 12/2002 | Fry et al. | 713/323 |
| 6,845,457 B1 | * | 1/2005 | Mirov et al. | 713/322 |
| 7,142,520 B1 | * | 11/2006 | Haverinen et al. | 370/311 |
| 7,330,989 B2 | * | 2/2008 | Bashford et al. | 713/323 |
| 7,546,618 B2 | * | 6/2009 | Bacon | 725/25 |
| 7,779,412 B2 | * | 8/2010 | Lin et al. | 718/102 |
| 7,937,600 B1 | * | 5/2011 | Lo | 713/323 |

(Continued)

FOREIGN PATENT DOCUMENTS

WO   WO 2008090400 A1 *  7/2008  ............. G06F 13/16
WO   WO 2011014579 A1 *  2/2011  ............. G06F 13/38

(Continued)

OTHER PUBLICATIONS

Definition of "deactivate", thefreedictionary.com (citing The American Heritage Dictionary of the English Language, Fourth Edition copyright © 2000 by Houghton Mifflin Company), retrieved from the Internet at <http://www.thefreedictionary.com/deactivate> on May 5, 2014.*

*Primary Examiner* — Faisal M Zaman
(74) *Attorney, Agent, or Firm* — Oblon, Spivak, McClelland, Maier & Neustadt, L.L.P.

(57) ABSTRACT

Provided are systems and methods for execution by a core of a peripheral component to provide power management for a data bus in a electronic device, such as a mobile electronic device. One method comprises determining whether a device in the peripheral component is inactive, transmitting a request for deactivation of at least one data channel to the device, receiving a command to deactivate the at least one data channel, determining whether any remaining devices in the peripheral component are active, and placing the peripheral component in a first low power mode wherein the core remains active in order to monitor a data bus clock.

16 Claims, 8 Drawing Sheets

(56) References Cited

U.S. PATENT DOCUMENTS

| | | | |
|---|---|---|---|
| 8,046,617 B2 * | 10/2011 | Fleck et al. | 713/324 |
| 8,073,452 B2 * | 12/2011 | Kossi et al. | 455/450 |
| 8,255,708 B1 * | 8/2012 | Zhang | 713/300 |
| 2003/0221135 A1 * | 11/2003 | Motoe et al. | 713/300 |
| 2004/0057069 A1 * | 3/2004 | Ikeda | 358/1.14 |
| 2004/0258085 A1 * | 12/2004 | Costo | 370/445 |
| 2005/0010831 A1 * | 1/2005 | Bashford et al. | 713/323 |
| 2005/0135384 A1 * | 6/2005 | Hipp et al. | 370/397 |
| 2005/0213596 A1 * | 9/2005 | Mizutani | 370/431 |
| 2005/0254453 A1 * | 11/2005 | Barneah | 370/328 |
| 2008/0070501 A1 * | 3/2008 | Wyld | 455/41.2 |
| 2008/0133952 A1 * | 6/2008 | Gan et al. | 713/322 |
| 2008/0195770 A1 * | 8/2008 | Wang et al. | 710/18 |
| 2008/0209246 A1 * | 8/2008 | Marks et al. | 713/323 |
| 2008/0215600 A1 * | 9/2008 | Kudo | 707/100 |
| 2008/0244557 A1 * | 10/2008 | Yeung et al. | 717/173 |
| 2009/0006710 A1 * | 1/2009 | Daniel et al. | 710/315 |
| 2010/0004001 A1 * | 1/2010 | Tao et al. | 455/456.1 |
| 2010/0144363 A1 * | 6/2010 | De Rosa et al. | 455/452.1 |
| 2010/0191995 A1 * | 7/2010 | Levy et al. | 713/323 |
| 2011/0051734 A1 * | 3/2011 | Cardona et al. | 370/400 |

FOREIGN PATENT DOCUMENTS

| | | | | |
|---|---|---|---|---|
| WO | WO 2012058467 A1 * | 5/2012 | | G06F 3/16 |
| WO | WO 2012142335 A1 * | 10/2012 | | G06F 13/372 |
| WO | WO 2012149298 A1 * | 11/2012 | | G06F 13/42 |
| WO | WO 2012149311 A1 * | 11/2012 | | G06F 13/42 |
| WO | WO 2013090752 A1 * | 6/2013 | | G06F 13/42 |

* cited by examiner

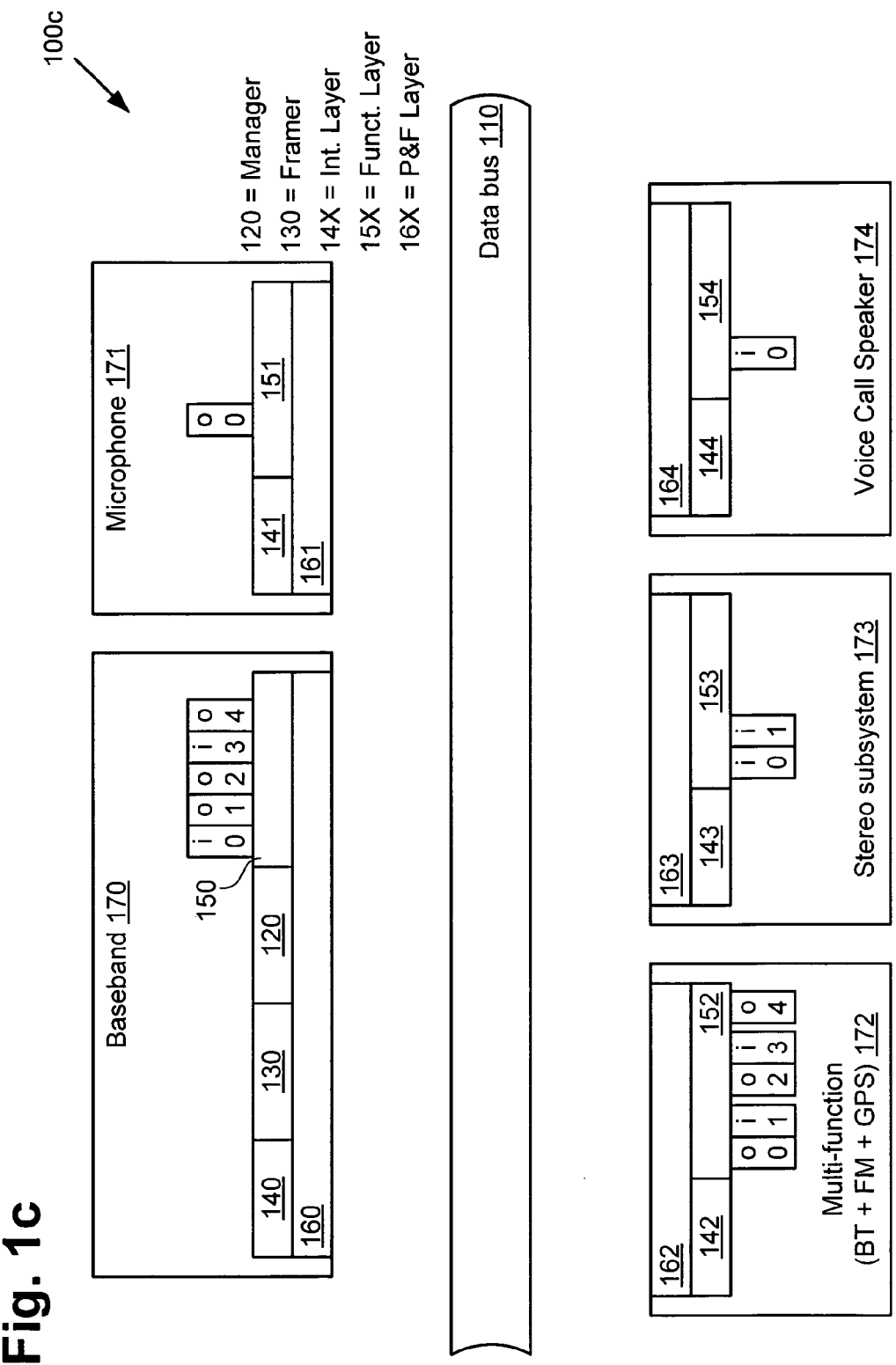

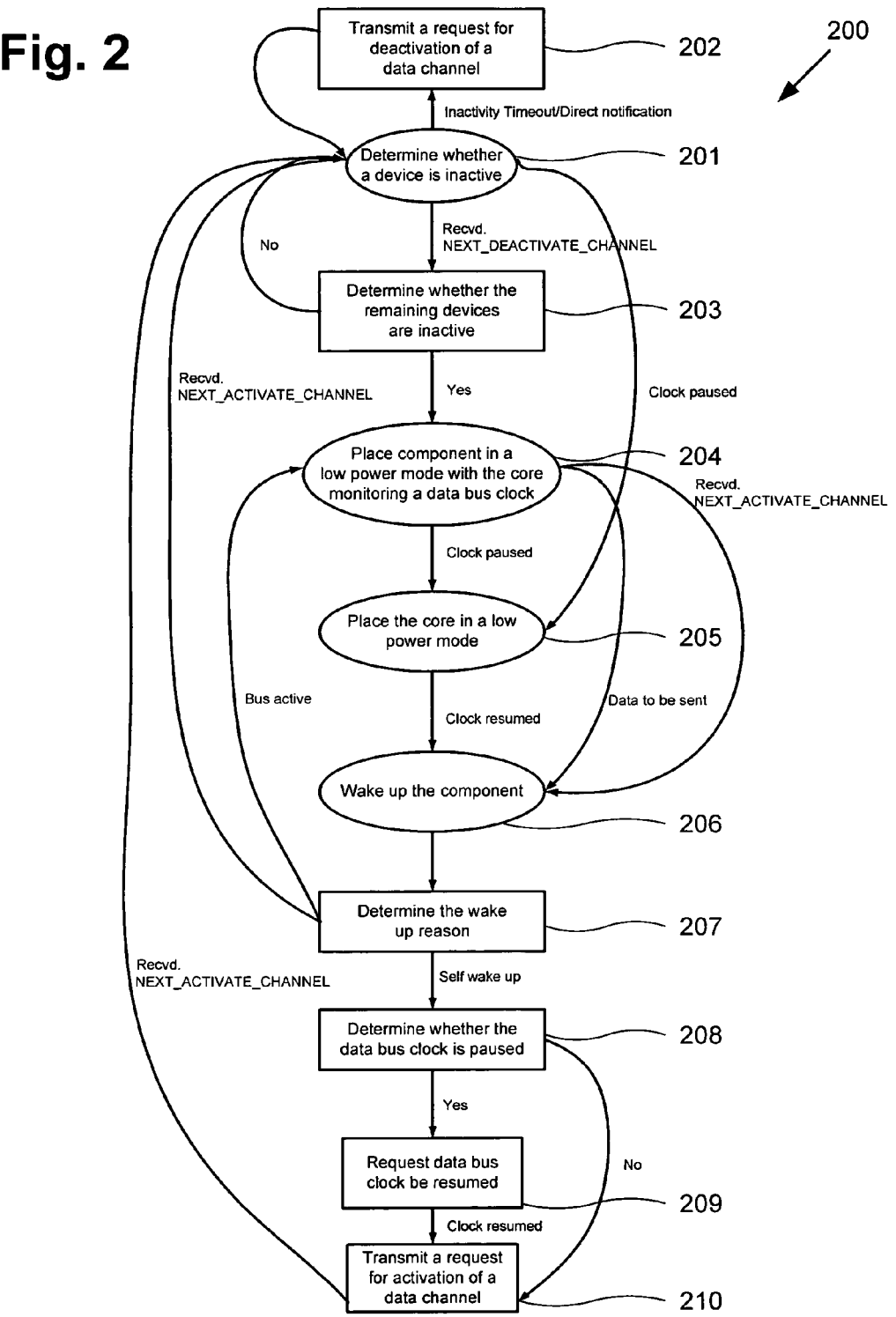

Case 1: A channel is still active
(SLIM_CLK is not paused)
Self wake up

Case 2: All channels are deactivated
(SLIM_CLK is paused)
Self wake up

Case 3: All channels are deactivated
(SLIM_CLK is paused)
Not a self wake up

METHOD FOR POWER MANAGEMENT OF DATA BUSES IN ELECTRONIC DEVICES

RELATED APPLICATIONS

This application is based on and claims priority from U.S. Provisional Patent Application Ser. No. 61/398,292, filed on Jun. 23, 2010, titled "Method for SLIMbus Power Management," which is hereby incorporated by reference in its entirety.

BACKGROUND OF THE INVENTION

1. Field of the Invention

The present invention relates generally to electronic devices. More particularly, the present invention relates to power management for electronic devices.

2. Background Art

Most mobile electronic devices have been developed under a constant pressure for reducing size and increasing capability. As such, there has been a significant incentive to simplify the underlying architecture of mobile electronic devices while providing enough adaptability to fold in new technology relatively quickly and easily.

One approach has been to develop a robust, standardized yet relatively simple and compact data bus architecture that can be used to interconnect the ever-increasing number of components comprising a modern mobile electronic device. Conventional data buses have typically been dedicated buses comprising large numbers of conductive traces or leads connecting each component individually, and implementations of such conventional data buses have therefore required significant amounts of space and relatively complex manufacturing processes, especially as mobile electronic devices have been miniaturized. Moreover, reliance on the more complex conventional data bus architectures has significantly increased the cost of developing new mobile electronic devices that offer increased functionality in the form of new combinations of new constituent components, particularly when the new components have been sourced from multiple manufacturers having different data bus protocols and standards.

Another approach to reducing size and increasing capability has been to reduce power consumption of mobile electronic devices generally, both to reduce the size of associated power supply systems and to increase device utility between, for example, charging times for a particular mobile electronic device.

Accordingly, there is a need to overcome the drawbacks and deficiencies in the art by providing a method for data bus power management that leverages a simple and compact bus architecture and significantly reduces power consumption in multi-component electronic devices.

SUMMARY OF THE INVENTION

There are provided methods for power management of data buses in electronic devices, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 1c presents a diagram of a system for providing power management of data buses in mobile electronic devices according to one embodiment of the present invention;

FIG. 2 shows a flowchart describing the steps, according to one embodiment of the present invention, by which power management of data buses in mobile electronic devices may be provided.

DETAILED DESCRIPTION OF THE INVENTION

The present application is directed to a method for power management of data buses in electronic devices, such mobile electronic devices. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1A:
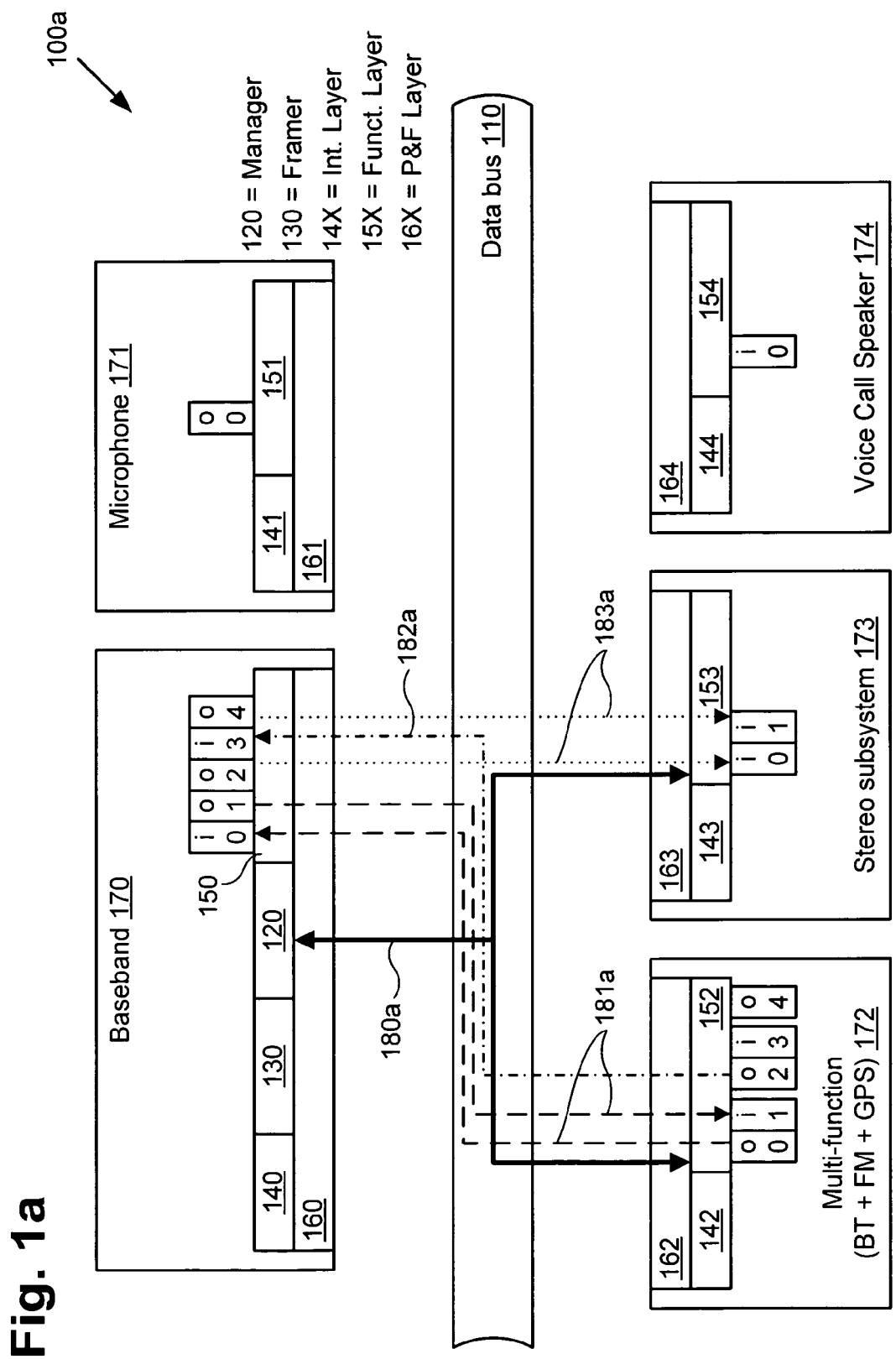
FIG. 1a presents a diagram of a system for providing power management of data buses in mobile electronic devices according to one embodiment of the present invention.

FIG. 1a presents a diagram of a system for providing power management of data buses in mobile electronic devices, according to one embodiment of the present invention. System 100a of FIG. 1a includes multiple components including baseband 170, microphone 171, multi-function component 172, stereo subsystem 173 and voice call speaker 174, all connected together through data bus 110. Data bus 110 may be configured to conform to a SLIMbus™ architecture as known in the art, for example, or any other relatively compact data bus architecture capable of supporting communications between multiple components in a mobile electronic device. Data bus 110 may support a data bus clock (e.g., a SLIM_CLK) having a programmable frequency, for example, and may also support one or more concurrent data channels. Together, the data bus clock and the data channels may be used to transmit data between components attached to data bus 110. Data bus 110 may support a standardized data transmission protocol, such as a SLIMbus™ transmission protocol as known in the art, for example, and the standardized protocol may support general bus management commands as well as generic messaging and data transmission between components. In order to reduce power consumption, data bus 110 may be configured to enter a low power mode in which a data bus clock of data bus 110 is paused, for example.

Baseband 170 includes manager 120, framer 130, interface layer 140, function layer 150, and physical and framing (P&F) layer 160. Together, interface layer 140 and P&F layer 160 may be referred to as the "core" of baseband 170. The core of baseband 170 may comprise one or more logic devices or processors, for example, and may be configured as a SLIMbus™ core, as known in the art, and to enable data transmission between input and output ports of function layer 150 and data bus 110. Accordingly, interface layer 140 and P&F layer 160 may correspond, respectively, to an interface device and a physical and framing layer in a SLIMbus™ component. Once any data transmission is able to reach data bus 110, it may be further transmitted to any component or group of components attached to data bus 110, as known in the art. The core of baseband 170 may also be configured to enable transmission of bus management commands and requests between manger 120, framer 130 and data bus 110.

As is known in the art, the core of baseband 170 may be programmed to perform various functions through use of firmware running on the core, and the core may additionally be configured to allow such firmware to be periodically updated using, for example, data bus 110. Utilizing such firmware, the core of baseband 170 may be configured to monitor data transmission activity of devices in function layer 150 and to place individual devices in function layer 150 into a low power mode designed to reduce power consumption while a particular device is inactive, for example. The core of baseband 170 may also be configured to wake a particular device in function layer 150 from a low power mode according to an internally generated electrical signal, for example, or according to an externally generated electrical signal transmitted over, for example, data bus 110. Moreover, the core of baseband 170 may be configured to place itself into a low power mode to reduce power consumption while all devices in function layer 150 are inactive and data bus 110 is inactive, for example, and wake itself from a low power mode according to an internally or externally generated electrical signal.

Manager 120 may comprise a logic device or processor, for example, and may be configured as a SLIMbus™ manager, as known in the art, and to manage and monitor data bus 110. As such, manager 120 may be capable of using data bus 110 to activate and deactivate data channels between any components attached to data bus 110, including itself. As is known in the art, manager 120 may be programmed to perform various functions through use of firmware running on manager 120, and manager 120 may be configured to allow such firmware to be periodically updated using, for example, data bus 110. Manager 120 may also be configured to transmit commands to framer 130 to control a data bus clock of data bus 110 to, for example, pause or resume a data bus clock in order to reduce power consumption while data bus 110 is inactive, or to select a frequency of a data bus clock of data bus 110. Moreover, manager 120 may be configured to place itself in an idle mode to further reduce power consumption, for example, and may also be configured to wake up from an idle mode according to an internally generated electrical signal, for example, or according to an externally generated electrical signal transmitted over, for example, data bus 110.

Framer 130 may comprise a logic device or processor, for example, and may be configured as a SLIMbus™ framer, as known in the art, and to deliver a data bus clock to all components connected to data bus 110. Framer 130 may also be configured to receive bus management commands from manager 120 that can be used to control a data bus clock of data bus 110, as described above.

Although manager 120 and framer 130 are shown as residing within the same component, namely baseband 170, it should be understood that they may reside on separate components and components different from baseband 170. Moreover, although FIG. 1a shows only one manager and one framer connected to data bus 110, other embodiments may comprise multiple managers and framers connected to a data bus, but where only one manager and one framer are active at any one time.

Function layer 150 of baseband 170 may comprise one or more logic devices or processors, for example, and may be configured as a SLIMbus™ generic device, as known in the art, and to provide the basic functionality of baseband 170. Function layer 150 may also comprise one or more input or output ports used to interface with the functionality of baseband 170. For example, function layer 150 of baseband 170 may be configured as one or more microprocessors providing user-application support for a mobile electronic device. As such, function layer 150 may request data channels connecting input ports 1 and 3 and output ports 1, 2 and 4 shown in FIG. 1a to other components attached to data bus 110 to enable various user-applications, such as networking, telephony, media playback, geo positioning, and any other user-applications supported by mobile electronic devices, as known in the art. Although function layer 150 is shown as having only five ports, it should be understood that function layer 150 may support a much larger number of ports in order to support a particular application or group of applications, as known in the art.

Because manager 120 lies within baseband 170, baseband 170 may be referred to as a host component of system 100a, while all other components connected to data bus 110 may be referred to as peripheral components. If system 100a instead included more than one component having a manager, then only the component having the currently active manager might be referred to as the host component, as is known in the art.

As shown in FIG. 1a, each of the peripheral components of system 100a, namely microphone 171, multi-function component 172, stereo subsystem 173 and voice call speaker 174, contain respective interface layers 141, 142, 143 and 144 (together, peripheral interface layers 141-144) corresponding to interface layer 140 of baseband 170, respective function layers 151, 152, 153 and 154 (together, peripheral function layers 151-154) corresponding to function layer 150 of baseband 170, and respective P&F layers 161, 162, 163 and 164 (together, peripheral P&F layers 161-164) corresponding to P&F layer 160 of baseband 170. Similar to the core of baseband 170, the combinations of peripheral interface layers 141-144 and peripheral P&F layers 161-164 within each peripheral component may be referred to as the respective "cores" of the peripheral components of system 100a. The cores of the peripheral components, much like the core of baseband 170, may comprise logic devices or processors running firmware, for example, and each may be configured to enable data transmission between input and output ports of respective peripheral function layers 151-154 and data bus 110. As such, the cores of the peripheral components may be configured to enable communication between manager 120, framer 130, and one or more of the components connected to data bus 110, as known in the art.

Each peripheral component in FIG. 1a may have a specific functionality that dictates the number and type of input and output ports of each of the peripheral function layers 151-154. For instance, microphone 171 may include a function layer 151 comprising a device dedicated to digitizing a signal from a mechanical transducer used as a voice microphone, for example, and may only require one output port to interface its output data with data bus 110. On the other hand, function layer 152 of multi-function component 172, for example, may comprise multiple integrated devices, each with their own functionality, that together require more than a single port.

For example, function layer 152 may comprise a Bluetooth™ modem, a FM tuner and a GPS receiver all integrated onto one semiconductor chip. As shown in FIG. 1a, port 0 of function layer 152 may be assigned to a high-bandwidth data output of a Bluetooth™ modem, while port 1 may be assigned to a high-bandwidth data input for a Bluetooth™ modem. Similarly, port 2 may be assigned to a high-bandwidth interleaved digital audio data output of an FM tuner, port 3 may be assigned to a low-bandwidth data input for an FM tuner (e.g., for tuning control), and port 4 may be assigned to a low-bandwidth data output of a GPS receiver, as known in the art. Continuing with stereo subsystem 173, stereo subsystem 173 may include a function layer 153 comprising a stereo amplifier and loudspeakers, for example, that may only accept separated left and right channel 44.1 kHz audio data at input ports 0 and 1 of function layer 153. Similarly, voice call speaker 174 may include a function layer 154 comprising a single channel amplifier and a small earphone transducer, for example, that may only accept single channel 8 kHz audio data at input port 0 of function layer 154.

Similar to the core of baseband 170, a core of a peripheral component may be configured to place any of the individual devices in its associated function layer in and out of a low power mode based on the activity of the particular device. Moreover, a core of a peripheral component may be configured to place itself in an out of a low power mode depending on the status of all devices in its associated function layer and the status of data bus 110.

For instance, the core of multi-function component 172 (e.g., interface layer 142 and P&F layer 162) may be configured to place any combination of its Bluetooth™ modem, FM tuner or GPS receiver in a low power mode when it detects that any one of the devices is inactive for a period of time, for example, or when any one of the devices notifies the core directly that it is inactive and may be placed in a low power mode. If all devices in function layer 152 are in a low power mode and data bus 110 is paused, the core of multi-function component 172 may then place itself in a low power mode to further reduce power consumption. As above, the core of multi-function 172 may be configured to wake itself and any of the devices in function layer 152 according to an internally or externally generated electrical signal.

Also shown in FIG. 1a are control data channel 180a, high-bandwidth data channels 181a, high-bandwidth data channel 182a and audio data channels 183a, where each channel is actively transmitting data. Each channel is formed over data bus 110 using manager 120, framer 130 and respective cores of baseband 170, multi-function component 172 and stereo subsystem 173. As can be seen from FIG. 1a, control data channel 180a may be configured to support bi-directional communication of bus management and messaging data between manager 120 and the cores of multi-function component 172 and stereo subsystem 173. High bandwidth data channels 181a and 182a, on the other hand, may be configured to support only unidirectional data transmissions from output ports of function layers 150 and 152 to input ports of function layers 150 and 152, as shown. Further, audio data channels 183a may be configured to support only unidirectional 44.1 kHz audio transmissions from output ports of function layer 150 to input ports of function layer 153, for example. Manager 120 may use framer 130 to configure a data bus clock of data bus 110 to have a frequency that supports all three types of data channels simultaneously, as is known in the art.

Although system 100a is shown as comprising a limited number of specific peripheral components and active data channels, it should be understood that the selection and number of components and data channels is not meant as a limitation of the present invention. System 100a may instead include a much larger number of components and component types, all communicating through data bus 110. Moreover, system 100a may include a much larger number of concurrent data channels and data channel types, all supported by data bus 110.

Thus, system 100a can be configured to support data transmission between all connected components, substantially concurrently, using data bus 110, manager 120, framer 130, and the cores of all the connected components. Furthermore, manager 120 and the cores of all the connected components may be configured to perform power management functions for system 100a, as will be explained more fully below.

Figure 1B:
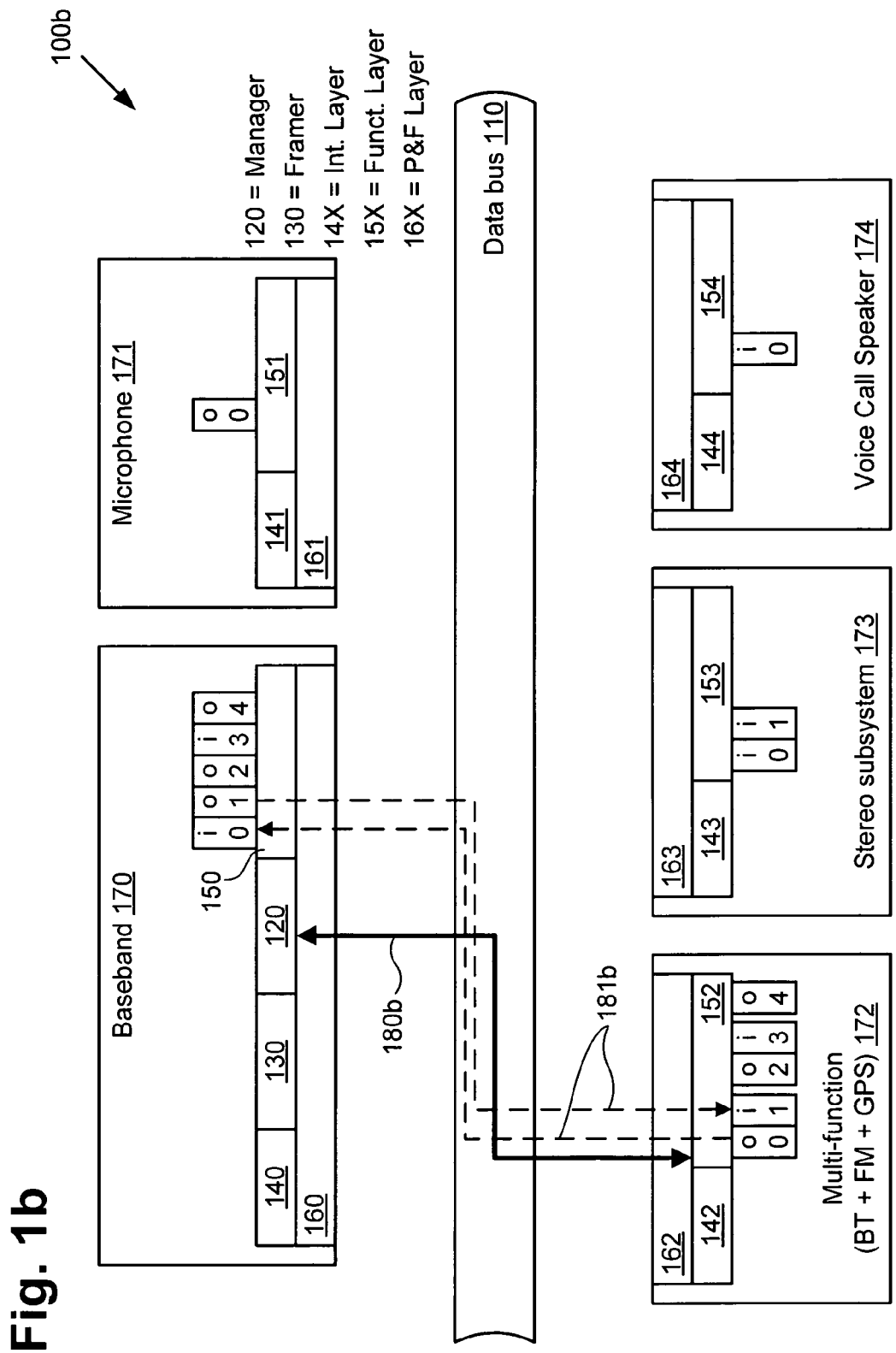
FIG. 1b presents a diagram of a system for power management of data buses in mobile electronic devices according to one embodiment of the present invention.

Moving to FIGS. 1b and 1c, FIGS. 1b and 1c present diagrams of system 100a of FIG. 1a at different stages of power management according to the present invention. For example, system 100b of FIG. 1b presents system 100a after high-bandwidth data channel 182a and audio data channels 183a have been deactivated and after the core of stereo subsystem 173 has placed function layer 153 in a low power mode while keeping itself active in order to, for example, monitor and remain in sync with a data bus clock of data bus 110 so as to be able to respond appropriately to bus commands.

Also shown in FIG. 1b are control data channel 180b and high-bandwidth data channels 181b. As can be seen from FIG. 1b, control data channel 180b may differ from control data channel 180a in that it may not be actively transmitting control data to the core of stereo subsystem 173. Furthermore, both control data channel 180b and high bandwidth data channels 181b may also differ from control data 180a and high bandwidth data channels 181a, respectively, in that each may be transmitted across data bus 110 according to a new frequency for a data bus clock of data bus 110, since data bus 110 no longer need support 44.1 kHz audio transmissions, such as those of audio data channels 183a in FIG. 1a.

System 100c of FIG. 1c presents system 100b after all data channels have been deactivated, after all cores and data bus 110 have been placed in a low power mode, and after manager 120 has placed itself in an idle mode. Further details of each stage of power management depicted in FIGS. 1a, 1b and 1c are presented below with reference to flow charts 200 and 300 in FIGS. 2 and 3.

Figure 3:
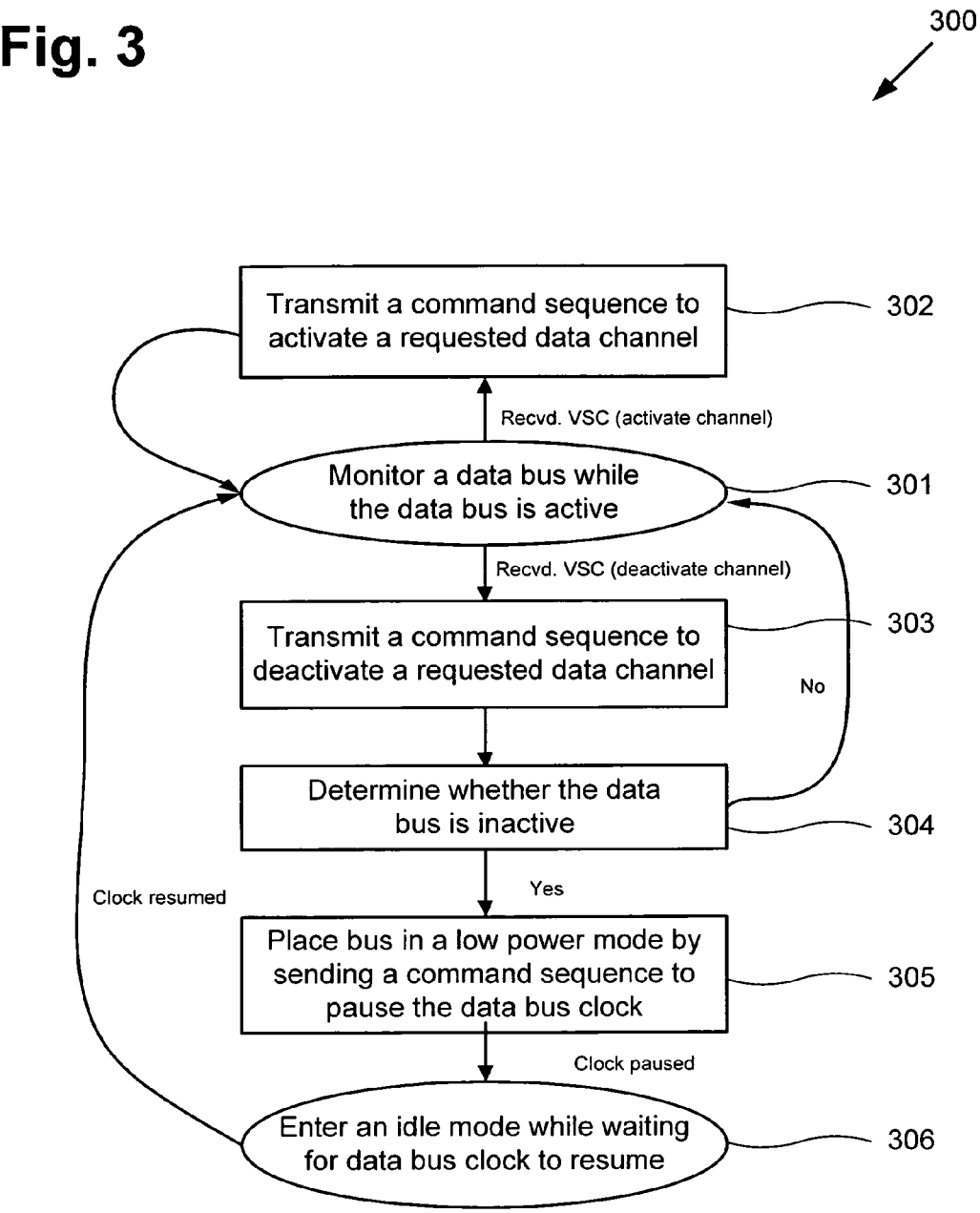
FIG. 3 shows a flowchart describing the steps, according to one embodiment of the present invention, by which power management of data buses in mobile electronic devices may be provided.
Figure 4:
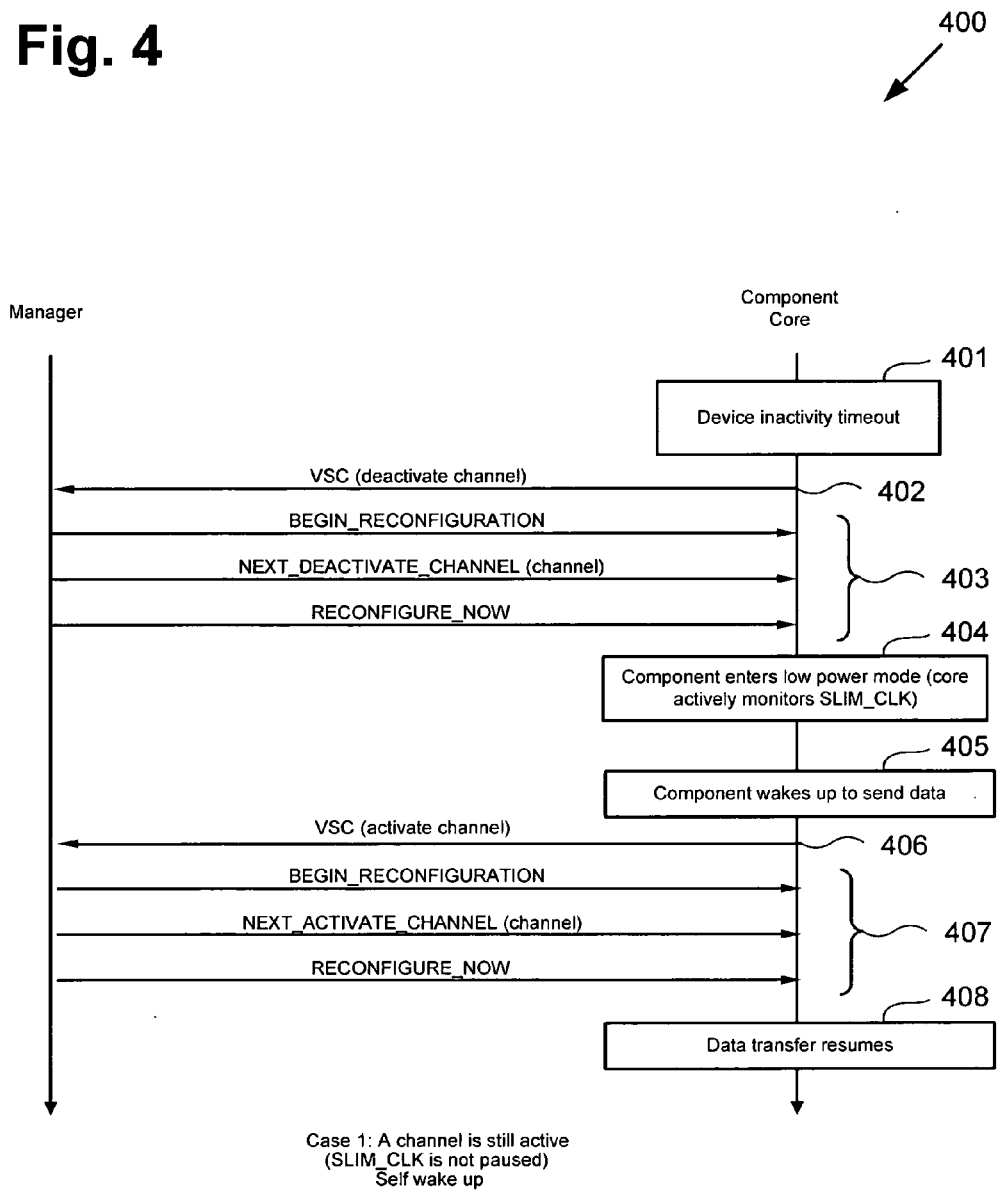
FIG. 4 shows a flowchart describing the steps, according to one embodiment of the present invention, by which power management of data buses in mobile electronic devices may be provided.
Figure 5:
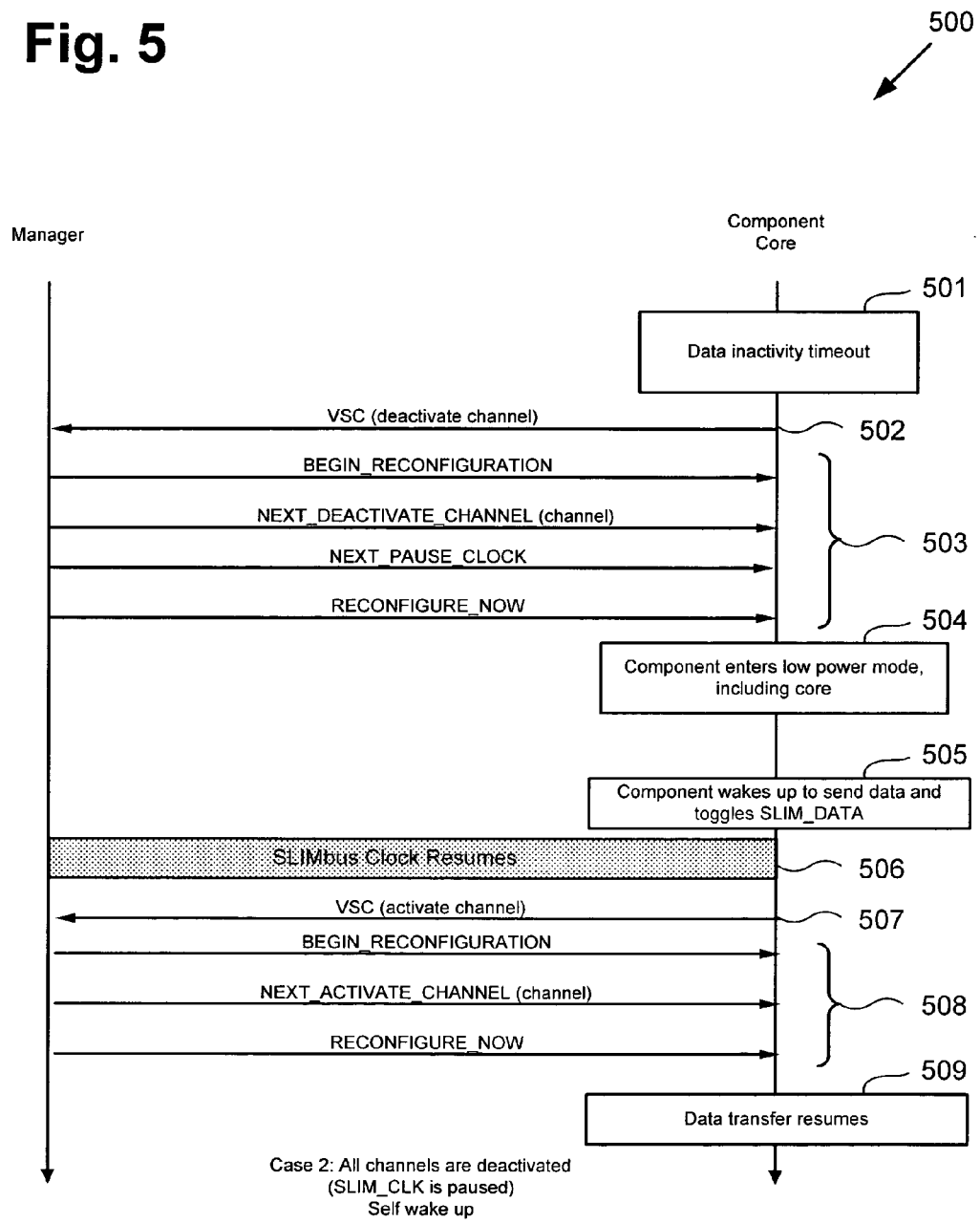
FIG. 5 shows a flowchart describing the steps, according to one embodiment of the present invention, by which power management of data buses in mobile electronic devices may be provided.
Figure 6:
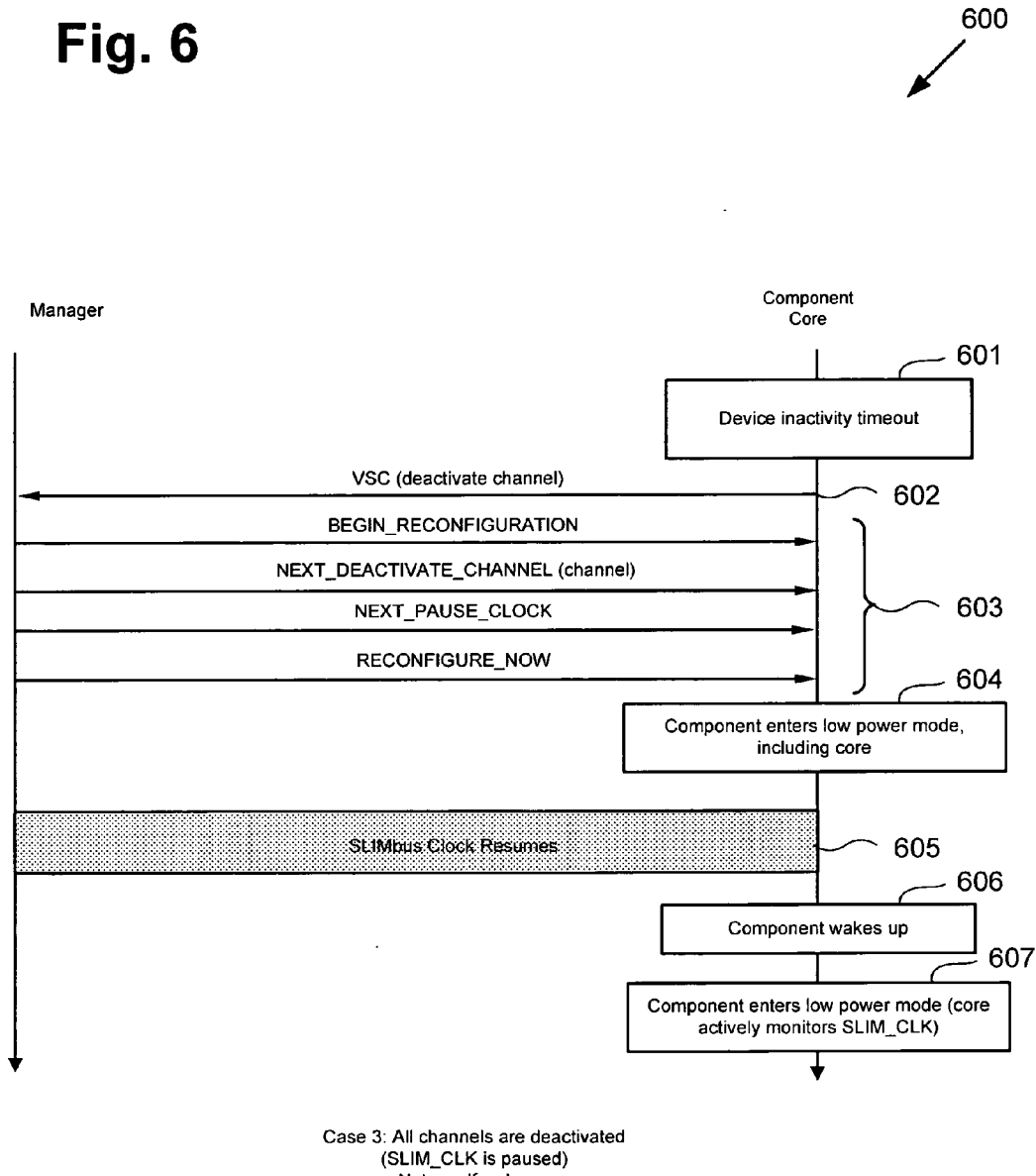
FIG. 6 shows a flowchart describing the steps, according to one embodiment of the present invention, by which power management of data buses in mobile electronic devices may be provided.

With respect to FIGS. 4, 5 and 6, FIGS. 4, 5 and 6 show respective messaging flows 400, 500 and 600 describing steps, according to different embodiments of the present invention, by which power management of data buses in mobile electronic devices may be provided. Certain details and features have been left out of messaging flows 400, 500 and 600 that are apparent to a person of ordinary skill in the art. For example, a step may comprise one or more substeps or may involve specialized equipment or materials, as known in the art. While the steps indicated in messaging flows 400, 500 and 600 are sufficient to describe individual embodiments of the present invention, other embodiments of the invention may utilize steps different from those shown in messaging flows 400, 500 and 600. Furthermore, messaging flows 400, 500 and 600 are offered to illustrate and supplement the description of flowchart 200 in FIG. 2 and flowchart 300 in FIG. 3, below.

Turning now to FIG. 2, FIG. 2 shows a flowchart 200 describing steps, according to one embodiment of the present invention, by which power management of data buses in mobile electronic devices may be provided. Certain details and features have been left out of flowchart 200 that are apparent to a person of ordinary skill in the art. For example, a step may comprise one or more substeps or may involve specialized equipment or materials, as known in the art. While steps 201 through 210 indicated in flowchart 200 are sufficient to describe one embodiment of the present invention, other embodiments of the invention may utilize steps different from those shown in flowchart 200.

Referring to step 201 of flowchart 200 in FIG. 2 and systems 100a, 100b and 100c of FIGS. 1a, 1b and 1c, respectively, step 201 of flowchart 200 comprises the core of multi-function component 172, for example, determining whether a device in function layer 152 is inactive. As previously described, the core of multi-function component 172 may monitor data channel 182a for inactivity for a period of time, e.g. an inactivity timeout, and accordingly determine that the device using port 2 of function layer 152 (e.g., an FM tuner) is inactive. Examples of such an inactivity timeout step are presented as steps 401, 501 and 601 in FIGS. 4, 5 and 6, respectively. Alternatively, the core of multi-function component 172 may be notified directly by the device using port 2 that the device is inactive. If either an inactivity timeout is determined, or there is direct notification of inactivity, the core of multi-function component 172 may be configured to move to step 202 of flowchart 200, for example, to transmit a request for deactivation of data channel 182a.

Also included in step 201, the core of multi-function component 172 may instead receive a bus management command from manager 120 to explicitly deactivate data channel 182a, such as a SLIMbus™ NEXT_DEACTIVATE_CHANNEL command as known in the art, for example, and, upon the deactivation of channel 182a, the core may be configured to move to step 203 of flowchart 200, for example, to determine whether all devices in multi-function component 172 are inactive. Alternatively, if the core of multi-function component 172 senses that a data bus clock of data bus 110 is paused, even while it is determining whether a device within multi-function component 172 is inactive, the core may be configured to move directly to step 205 of flowchart 200, for example, and immediately place itself in a low power mode.

Although not explicitly shown in FIG. 2, step 201 may also include the case where the core of multi-function component 172 may be configured to determine that a data channel needs to be activated or reactivated according to, for example, a data requirement of one of the devices in function layer 152. Upon reaching such determination, the core of multi-function component 172 could be configured to move to a step (not shown in FIG. 2) similar to step 202, but where the core transmits a request to activate rather than deactivate a data channel and then moves back to step 201.

Referring to step 202 of flowchart 200 in FIG. 2 and systems 100a, 100b and 100c of FIGS. 1a, 1b and 1c, respectively, step 202 of flowchart 200 comprises the core of multi-function component 172 transmitting a request for deactivation of data channel 182a to manager 120. The request may by encoded as a vendor specific code (VSC) in a SLIMbus™ REPORT_INFORMATION message as known in the art, for example, and may be transmitted over control data channel 180a, for example, to manager 120. Examples of such a request made under varying circumstances are presented as steps 402, 502 and 602 of FIGS. 4, 5 and 6, respectively. The use of a particular encoding method may be configured within firmware running on the core of multi-function component 172 and manager 120, and, as such, may be changed or updated periodically with updates to the firmware. Upon transmitting a request for deactivation, the core of multi-function component 172 may be configured to move back to step 201 of flowchart 200, for example, to wait for data channel 182a to be deactivated, as shown in FIG. 2.

Referring to step 203 of flowchart 200 in FIG. 2 and systems 100a, 100b and 100c of FIGS. 1a, 1b and 1c, respectively, step 203 of flowchart 200 comprises the core of multi-function component 172 determining whether all remaining devices in multi-function component 172 are inactive. The core of multi-function component 172 may be configured to determine remaining device inactivity based on whether one or more data channels to function layer 152 are currently established, independently of whether the data channels are actively transmitting data. As can be seen in FIGS. 1a and 1b, even after data channel 182a is deactivated, at least one device in function layer 152 is still active because data channels 181b are still established. Thus, in cases where at least one device in multi-function component 172 is active, the core of multi-function component 172 may be configured to move back to a previous step of flowchart 200, such as step 201, and determine whether a next device in function layer 152 is inactive. If, instead, the core of multi-function component 172 determines that there are no remaining data channels to function layer 152, as depicted in FIG. 1c, then the core might be configured to determine all remaining devices in multi-function component 172 are inactive and then place multi-function component 172 in a low power mode to reduce power consumption, as shown by step 204 of flowchart 200, for example.

Referring to step 204 of flowchart 200 in FIG. 2 and systems 100a, 100b and 100c of FIGS. 1a, 1b and 1c, respectively, step 204 of flowchart 200 comprises the core of multi-function component 172 placing multi-function component 172 in a low power mode such that only the core of multi-function component 172 remains active in order to monitor a data bus clock of data bus 110. An example of such action is presented by step 404 in FIG. 4. This low power mode may include de-powering portions of function layer 152 in order to reduce power consumption, for example, but where the core of multi-function component 172 is left powered so it can monitor a data bus clock, for example, both to detect a pause of the data bus clock and to stay in sync with the data bus clock.

While multi-function component 172 is in this low power mode, the core of multi-function component 172 may receive an externally generated command to activate a data channel to function layer 152, such as a SLIMbus™ NEXT_ACTIVATE_CHANNEL command as known in the art, for example, and may be configured to perform a wake up procedure for multi-function component 172, for example, as shown in step 206 of flowchart 200. Alternatively, still while in this low power mode, the core of multi-function component 172 may receive direct notice from function layer 152 that a device in function layer 152 is ready to send data to another component on data bus 110, for example. In such case, the core of multi-function component 172 may be configured to perform the same wake up step 206 in flowchart 200, for example, except that the core would be instead be performing a self wake up because the notice was generated internally by function layer 152. If, instead of receiving a command to activate a data channel or receiving direct notice, the core of multi-function component 172 senses that a data bus clock of data bus 110 is paused, the core may be configured to place itself in a low power mode, for example, as shown by step 205 in FIG. 2.

Referring to step 205 of flowchart 200 in FIG. 2 and systems 100a, 100b and 100c of FIGS. 1a, 1b and 1c, respectively, step 205 of flowchart 200 comprises the core of multi-function component 172 placing itself in a low power mode so as to further reduce power consumption while a data bus clock of data bus 110 is paused. Examples of such action are presented by steps 504 and 604 of FIGS. 5 and 6, respectively. The core of multi-function component 172 may be configured to stay in this low power mode until it senses that a data bus clock of data bus 110 has resumed, for example, after which it may move to step 206 of flowchart 200, for example, and wake up multi-function component 172.

Referring to step 206 of flowchart 200 in FIG. 2 and systems 100a, 100b and 100c of FIGS. 1a, 1b and 1c, respectively, step 206 of flowchart 200 comprises the core of multi-function component 172 waking up multi-function component 172 by powering both the core and the remaining portions of multi-function component 172. If the core of multi-function component 172 is not waking up from a low power mode, then only the remaining portions of multi-function component 172 may be woken up.

Referring to step 207 of flowchart 200 in FIG. 2 and systems 100a, 100b and 100c of FIGS. 1a, 1b and 1c, respectively, step 207 of flowchart 200 comprises the core of multi-function component 172 determining a reason for waking up multi-function component 172 in a previous step, such as step 206 of flowchart 200, for example. If the core has woken up multi-function component 172 only because a data bus clock of data bus 110 has resumed from being paused, then the core may be configured to move back to step 204 of flowchart 200, for example, and place multi-function component 172 in a low power mode such that only the core of multi-function component 172 remains active, as described above. An example of such a process is presented by steps 605 through 607 of FIG. 6. If, instead, the core of multi-function component 172 has received an externally generated command to activate a data channel to function layer 152, such as a SLIM-bus™ NEXT_ACTIVATE_CHANNEL command, for example, the core may be configured to move back to step 201 of flowchart 200, for example, and start the power management process over from the beginning, as is shown in FIG. 2.

Alternatively, if the core of multi-function component 172 has received direct notice from function layer 152 that a device in function layer 152 is ready to send data to another component on data bus 110, e.g., the device has performed a self wake up, the core may be configured to move to step 208 to determine whether a data bus clock of data bus 110 is currently paused, as shown in FIG. 2. For example, if a Bluetooth™ modem in function layer 152 has been in a low power mode but has received a wake signal from some external Bluetooth™ device, function layer 152 may notify the core of multi-function component 172 that a device is ready to send data to, for example, baseband 170. The core of multi-function component 172, upon such notification, may then proceed to determining whether a data bus clock of data bus 110 is paused, as shown by step 208 of flowchart 200.

Referring to step 208 of flowchart 200 in FIG. 2 and systems 100a, 100b and 100c of FIGS. 1a, 1b and 1c, respectively, step 208 of flowchart 200 comprises the core of multi-function component 172 determining whether a data bus clock of data bus 110 is currently paused. As described previously, a data bus clock of data bus 110 may be paused by manager 120 and framer 130 when manager 120 determines that data bus 110 is inactive, for example. If the data bus clock is paused, then the core of multi-function component 172 may be configured to move to step 209 of flow chart 200, for example, and request a data bus clock of data bus 110 be resumed. Alternatively, the core may be configured to move to step 210 of flowchart 200, for example, and transmit a request to activate a data channel to function layer 152.

Referring to step 209 of flowchart 200 in FIG. 2 and systems 100a, 100b and 100c of FIGS. 1a, 1b and 1c, respectively, step 209 of flowchart 200 comprises the core of multi-function component 172 requesting a data bus clock of data bus 110 be resumed. Such a request may comprise, for example, simply toggling a SLIM_DATA line of a SLIMbus™ data bus to signal to framer 130 to resume a data bus clock of data bus 110, as known in the art. An example of such a request is presented by 505 of FIG. 5. Once a data bus clock of data bus 110 has resumed, the core of multi-function component 172 may be configured to move to step 210 of flowchart 200, for example, and transmit a request for activation of one or more data channels to function layer 152.

Referring to step 210 of flowchart 200 in FIG. 2 and systems 100a, 100b and 100c of FIGS. 1a, 1b and 1c, respectively, step 210 of flowchart 200 comprises the core of multi-function component 172 transmitting a request for activation of one or more data channels to function layer 152. Similar to the request for deactivation of a data channel described above, the request may by encoded as a VSC in a SLIMbus™ REPORT_INFORMATION message as known in the art, for example, and may be transmitted over a control data channel, such as control data channel 180b for example, to manager 120. Examples of such a request are presented by steps 406 and 507 of FIGS. 4 and 5, respectively. The use of a particular encoding method may be configured within firmware running on the core of multi-function component 172 and manager 120, and, as such, may be changed or updated periodically with updates to the firmware. Upon transmitting a request for activation, the core of multi-function component 172 may be configured to move back to step 201 of flowchart 200 as shown in FIG. 2, for example, when data channel 182a, for example, is activated, as well as to restart the power management process.

Thus, the present invention provides a method for data bus management that can leverage an existing simple and compact bus architecture, such as the SLIMbus™ architecture as known in the art, without requiring changes in the devices making up a particular function layer, for example, and without requiring an additional bus or additional bus width to enable power management signaling. Therefore, the present invention may significantly reduce power consumption in multi-component mobile electronic devices without increasing the cost or bulk of mobile electronic devices.

Turning now to FIG. 3, FIG. 3 shows a flowchart 300 describing steps, according to an embodiment of the present invention, by which power management of data buses in mobile electronic devices may be provided. As with flowchart 200 of FIG. 2, certain details and features have been left out of flowchart 300 that are apparent to a person of ordinary skill in the art. For example, a step may comprise one or more sub-steps or may involve specialized equipment or materials, as known in the art. While steps 301 through 306 indicated in flowchart 300 are sufficient to describe one embodiment of the present invention, other embodiments of the invention may utilize steps different from those shown in flowchart 300.

Referring to step 301 of flowchart 300 in FIG. 3 and systems 100a, 100b and 100c of FIGS. 1a, 1b and 1c, respectively, step 301 of flowchart 300 comprises manager 120 monitoring data bus 110 while data bus 110 is active. As explained previously, manager 120 may be monitoring data bus 110 for bus management requests over, for example, control data bus 180a in FIG. 1a. If manager 120 receives a request to activate a particular data channel, manager 120 may be configured to move to step 302 of flowchart 300, for example, and activate the requested data channel. If, instead, manager 120 receives a request to deactivate an existing data channel, manager 120 may be configured to move to step 303 of flowchart 300, for example, and deactivate the data channel.

For instance, the core of multi-function component 172 in system 100a of FIG. 1a may determine that a particular device in its function layer 152 is inactive and send a request over control data channel 180a to manager 120 to deactivate, for example, data channel 182a. Similarly, the core of stereo subsystem 173 may also determine that its function layer 153 is inactive because data channels 183a are no longer transmitting data, for example, and also request deactivation of channels 183a. Upon receiving each request, manager 120 may deactivate each respective channel as shown by step 303 of flowchart 300, for example.

Referring to step 302 of flowchart 300 in FIG. 3 and systems 100a, 100b and 100c of FIGS. 1a, 1b and 1c, respectively, step 302 of flowchart 300 comprises manager 120 activating a requested data channel. To activate a requested data channel, manager 120 may be configured to transmit a particular data bus management command, such as a SLIMbus™ shared message channel (SMC) command sequence, for example, across data bus 110, as is known in the art. Examples of such a command sequence are presented by steps 407 and 508 of FIGS. 4 and 5, respectively. For example, if baseband 170 of system 100b in FIG. 1b wishes to reactivate audio data channels 183a of system 100a as shown in FIG. 1a, it may send a VSC (activate 183a) request to manager 120, and manager 120 may send an SMC command sequence across data bus 110 to activate audio data channels 183a and re-establish system 100a as shown in FIG. 1a.

Referring to step 303 of flowchart 300 in FIG. 3 and systems 100a, 100b and 100c of FIGS. 1a, 1b and 1c, respectively, step 303 of flowchart 300 comprises manager 120 deactivating a requested data channel. Similar to step 302, above, in order to deactivate a requested data channel, manager 120 may be configured to transmit a particular data bus command sequence, such as a SLIMbus™ SMC command sequence, for example, across data bus 110, as is known in the art. An example of such a command sequence is presented by step 403 of FIG. 4. For example, if baseband 170 of system 100a in FIG. 1a wishes to deactivate audio data channels 183a in FIG. 1a, it may send a VSC(deactivate 183a) request to manager 120, and manager 120 may send an SMC sequence command across data bus 110 to deactivate audio data channels 183a and establish system 100b as shown in FIG. 1b.

Referring to step 304 of flowchart 300 in FIG. 3 and systems 100a, 100b and 100c of FIGS. 1a, 1b and 1c, respectively, step 304 of flowchart 300 comprises manager 120 determining whether data bus 110 is inactive. Because manager 120 manages both data bus 110 and any data channels formed over data bus 110, manager 120 may determine whether data bus 110 is inactive by determining whether there are any currently existing data channels formed over data bus 110. If manager 120 determines that data bus 110 is still active, it may be configured to move back to step 301 of flowchart 300, for example, to continue monitoring data bus 110, as shown in FIG. 3. If, instead, manager 120 determines that data bus 110 is inactive, manager 120 may be configured to move to step 305 of flowchart 300, for example, and place data bus 110 in a low power mode.

It should be noted that in another embodiment, manager 120 may determine data bus inactivity before performing step 303, such that manager 120 may determine whether the data channel to be deactivated is a last existing data channel of data bus 110, for example, and then combine the bus commands for deactivation of the last channel with bus commands for placing data bus 110 in a low power mode by, for example, pausing a data clock of data bus 110. Examples of such a command sequence are presented by steps 503 and 603 of FIGS. 5 and 6, respectively.

Referring to step 305 of flowchart 300 in FIG. 3 and systems 100a, 100b and 100c of FIGS. 1a, 1b and 1c, respectively, step 305 of flowchart 300 comprises manager 120 placing data bus 110 in a low power mode by pausing a data bus clock of data bus 110. As described previously, manager 120 may be configured to pause a data bus clock of data bus 110 by transmitting a data bus command sequence, such as a SLIMbus™ SMC command sequence, for example, to framer 130 to pause the data bus clock. Such an SMC command sequence might be similar to those shown in steps 503 and 603 of FIGS. 5 and 6, respectively, but would not include additional commands to deactivate a data channel. For example, manager 120 in system 100b of FIG. 1b, upon determining that the last remaining data channels on data bus 110, e.g. data channels 181b of FIG. 1b, have been deactivated in previous steps, may send an SMC command sequence across data bus 110 that pauses a data bus clock of data bus 110, thereby establishing system 100c shown in FIG. 1c.

Pausing a data bus clock of data bus 110 may reduce power consumption directly by de-powering the circuitry needed to generate a data bus clock for data bus 110, for example, and may also reduce power consumption indirectly by signaling the cores of all components attached to data bus 110 to enter their low power modes, as described above with reference to step 201 of flowchart 200 in FIG. 2. Once a data bus clock of data bus 110 has been paused, manager 120 may be configured to move to step 306 of flow chart 300, for example, and enter an idle mode while the data bus clock is paused.

Referring to step 306 of flowchart 300 in FIG. 3, flowchart 500 in FIG. 5, and systems 100a, 100b and 100c of FIGS. 1a, 1b and 1c, respectively, step 306 of flowchart 300 comprises manager 120 entering an idle mode configured to further reduce power consumption while a data bus clock of data bus 110 is paused. This idle mode may comprise de-powering portions of manager 120 except for a portion left minimally powered to monitor data bus 110 for a data bus clock of data bus 110 to be resumed by framer 130, for example. For instance, the core of multi-function component 172, as shown in FIG. 1c, may toggle a SLIM_DATA line of a SLIMbus™ data bus to signal to framer 130 to activate a data bus clock of data bus 110, as depicted by step 505 of flowchart 500 in FIG. 5. Once framer 130 has resumed a data bus clock of data bus 110, manager 120 may be configured to move back to step 301 of flowchart 300, for example, to monitor data bus 110 for bus management requests while data bus 110 is active.

Thus, as stated previously, the present invention provides a method for data bus management that can leverage an existing simple and compact bus architecture, such as the SLIMbus™ architecture as known in the art, without requiring physical changes to a manager of a data bus, for example, and without requiring an additional bus or additional bus width to enable power management signaling. Therefore, the present invention may significantly reduce power consumption in multi-component mobile electronic devices without increasing the cost or bulk of mobile electronic devices.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for execution by a core of a peripheral component to provide power management for a data bus in an electronic device, the method comprising:
    determining that a device in the peripheral component is inactive;
    transmitting a request to deactivate at least one data channel to the device;
    receiving a command to deactivate the at least one data channel;
    determining whether all other devices in the peripheral component are inactive, based on whether one or more data channels between at least one of the other devices and the data bus are established, the determining of whether all other devices in the peripheral component are inactive being independent of data transmission via the one or more data channels, all of the other devices in the peripheral component are determined to be inactive when no data channels between the other devices and the data bus are established; and
    placing the peripheral component in a first low power mode when no data channels between the other devices and the data bus are established, wherein the core remains active in the first low power mode in order to monitor a data bus clock.

2. The method of claim 1, wherein the determining that the device is inactive comprises detecting an inactivity timeout for the at least one data channel.

3. The method of claim 1, wherein the determining that the device is inactive comprises direct notification from the device that the device is inactive.

4. The method of claim 1, further comprising:
    waking up the peripheral component in response to receipt of a command to activate at least one other data channel.

5. The method of claim 1, further comprising:
    detecting that the data bus clock is paused; and
    placing the core in a second low power mode, wherein the core is inactive in the second low power mode to further reduce power consumption.

6. The method of claim 1, further comprising:
    detecting that the data bus clock is paused;
    placing the core in a second low power mode, wherein the core is inactive in the second low power mode to further reduce power consumption;
    waking up the peripheral component in response to resumption of the data bus clock; and
    placing the peripheral component in a first low power mode, wherein the core remains active in the first low power mode in order to monitor the data bus clock.

7. The method of claim 1, further comprising:
    detecting that the data bus clock is paused;
    placing the core in a second low power mode, wherein the core is inactive in the second low power mode to further reduce power consumption;
    waking up the peripheral component based on a self wake up thereof;
    determining that the data bus clock is not paused after waking up the peripheral component; and
    transmitting a request to activate at least one other data channel to the device.

8. The method of claim 1, further comprising:
    detecting that the data bus clock is paused;
    placing the core in a second low power mode, wherein the core is inactive in the second low power mode so as to further reduce power consumption;
    waking up the peripheral component based on a self wake up thereof;
    determining that the data bus clock is paused after waking up the peripheral component;
    requesting that the data bus clock be resumed; and
    transmitting a request to activate at least one other data channel to the device.

9. A peripheral component, comprising:
    core circuitry configured to
        determine that a device in the peripheral component is inactive,
        transmit a request to deactivate at least one data channel to the device,
        receive a command to deactivate the at least one data channel,
        determine whether all other devices in the peripheral component are inactive, based on whether one or more data channels between at least one of the other devices and the data bus are established, the determining of whether all other devices in the peripheral component are inactive being independent of data transmission via the one or more data channels, all of the other devices in the peripheral component are determined to be inactive when no data channels between the other devices and the data bus are established, and
        placing the peripheral component in a first low power mode when no data channels between the other devices and the data bus are established, wherein the core remains active in the first low power mode in order to monitor a data bus clock.

10. The peripheral component of claim 9, wherein the core circuitry further detects an inactivity timeout for the at least one data channel when determining whether the device in the peripheral component is inactive.

11. The peripheral component of claim 9, wherein the core circuitry further receives direct notification from the device that the device is inactive.

12. The peripheral component of claim 9, wherein the core circuitry is further configured to wake up the peripheral component in response to receipt of a command to activate at least one other data channel.

13. The peripheral component of claim 9, wherein the core circuitry is further configured to detect that the data bus clock is paused, and place the core in a second low power mode in which the core circuitry is inactive to further reduce power consumption.

14. The peripheral component of claim 9, wherein the core circuitry is further configured to detect that the data bus clock is paused, place the core circuitry in a second low power mode in which the core circuitry is inactive, wake up the peripheral component in response to resumption of the data bus clock, and place the peripheral component in a first low power mode in which the core circuitry remains active in order to monitor the data bus clock.

15. The peripheral component of claim 9, wherein the core circuitry is further configured to detect that the data bus clock is paused, place the core circuitry in a second low power mode in which the core circuitry is inactive, wake the peripheral component based on a self wake up thereof, determine that the data bus clock is not paused after waking up the peripheral component, and transmit a request to activate at least one other data channel to the device.

16. The peripheral component of claim 9, wherein the core circuitry is further configured to detect that the data bus clock is paused, place the core circuitry in a second low power mode in which the core circuitry is inactive, wake up the peripheral component based on a self wake up thereof, determine that the data bus clock is paused after waking up the peripheral component, request that the data bus clock be resumed, and transmit a request to activate at least one other data channel to the device.

* * * * *